US010599570B1

(12) United States Patent
Ding et al.

(10) Patent No.: US 10,599,570 B1
(45) Date of Patent: Mar. 24, 2020

(54) EXPIRATION OF OFFLINE MAP DATA

(71) Applicant: GOOGLE LLC, Mountain View, CA (US)

(72) Inventors: Yiyang Joy Ding, San Francisco, CA (US); Jennifer Maurer, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 385 days.

(21) Appl. No.: 14/743,548

(22) Filed: Jun. 18, 2015

Related U.S. Application Data

(60) Provisional application No. 62/015,365, filed on Jun. 20, 2014.

(51) Int. Cl.
  *G06F 12/00* (2006.01)
  *G06F 13/00* (2006.01)
  *G06F 12/0831* (2016.01)

(52) U.S. Cl.
  CPC ...... *G06F 12/0833* (2013.01); *G06F 2212/62* (2013.01)

(58) Field of Classification Search
  None
  See application file for complete search history.

(56) References Cited

U.S. PATENT DOCUMENTS

| 8,374,782 | B2 | 2/2013 | Santesson et al. |
| 8,533,293 | B1* | 9/2013 | Sivasubramanian ........ H04L 67/2842 707/999.01 |
| 8,560,600 | B2 | 10/2013 | Maurer et al. |
| 8,681,176 | B1 | 3/2014 | Maurer et al. |
| 8,928,691 | B2 | 1/2015 | Maurer et al. |
| 2009/0037660 | A1* | 2/2009 | Fairhurst ............ G06F 12/126 711/129 |
| 2012/0143504 | A1* | 6/2012 | Kalai .................. G01C 21/32 701/533 |

FOREIGN PATENT DOCUMENTS

EP    0 604 139 A1    6/1994
WO    WO-2007/102099 A1    9/2007

OTHER PUBLICATIONS

Method for self-expiring web browset histiry, bookmarks, and local caching, by IBM 2003.*

* cited by examiner

*Primary Examiner* — Tuan V Thai
(74) *Attorney, Agent, or Firm* — Marshall, Gerstein & Borun LLP

(57) ABSTRACT

Map data is fetched into a memory of a computing device for generating a digital map of a geographic area. In response to a request for the digital map, the map data is retrieved from the memory to generate the digital map. A determination is made whether a user of the computing device is likely to request the digital map again within a certain period of time, and a time when the map data should be removed from the memory is then determined based at least in part on this determination. The map data is removed from the memory at the determined time.

2 Claims, 3 Drawing Sheets

EXPIRATION OF OFFLINE MAP DATA

CROSS-REFERENCE TO RELATED APPLICATION

This application to U.S. Provisional Patent Application. No. 62/015,365, filed on Jun. 20, 2014, and titled "Expiration of Offline Map Data," the entire disclosure of which is hereby expressly incorporated by reference herein.

FIELD OF TECHNOLOGY

This disclosure relates to interactive digital maps and, more particularly, to managing offline map data in client devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications that provide interactive digital maps ("mapping applications") can operate on computing devices that generally have a substantially permanent network connection as well as on portable devices such as smartphones, tablet computers, car navigation systems, other suitable devices, and combination thereof, which typically rely on a mobile, wireless, or otherwise relatively less permanent network connection. A mapping application typically receives a user query specifying a geographic location, obtains a digital map from a network server in an online mode, and provides the digital map via a user interface. If the mapping application caches some of the map content, the user also can access map data in an offline mode.

SUMMARY

Generally, a digital mapping application of this disclosure determines expiration time for offline map data stored in the cache of a portable client device, using one or several signals. The mapping application then removes the offline map data from the cache in accordance with the determined expiration time. The signals for a geographic area can include, for example, the probability that the user visits the geographic area regularly (or, conversely, is making a one-time irregular visit to the geographic area), the general proximity of the geographic area to the user's home location, work location, or a frequently visited location, the use or non-use of the map data in the past, other suitable signals related to geographic information, or any combination thereof. The mapping application also can check the amount of free memory remaining in the cache to determine when offline map data should expire. Thus, the mapping application in different situations can determine different expiration times for map data, and in this sense the mapping application determines expiration times dynamically.

In particular, one example method for managing offline map data in computing devices includes (i) fetching, by one or more processors, into a memory of a computing device, map data for generating a digital map of a geographic area, (ii) retrieving, by the one or more processors, the map data from the memory to generate the digital map in response to a request for the digital map, (iii) determining, by the one or more processors, whether a user of the computing device is likely to request the digital map again within a certain period of time, (iv) determining, by the one or more processors, a time when the map data should be removed from the memory based at least in part on the determination whether the user is likely to request the digital map again within the certain period of time, and (v) removing, by the one or more processors, the map data from the memory at the determined time.

Another example method for managing offline map data in computing devices includes (i) determining, by one or more processors of a computing device, a geographic area for which a user of the computing device is likely to request a digital map, (ii) automatically pre-fetching, by the one or more processors into a memory of the computing device, map data for generating the digital map, prior to receiving a request for the digital map from the user, (iii) at a time subsequent to pre-fetching the map data, determining, by the one or more processors, whether the user is likely to request the digital map within a certain period of time, (iv) determining, by the one or more processors, a time when the map data should be removed from the memory based at least in part on the determination whether the user is likely to request the digital map again within the certain period of time, and (v) removing, by the one or more processors, the map data from the memory at the determined time.

In another embodiment, a portable computing includes one or more processors, a network interface to communicatively couple the portable computing device to a network server via a communication network, in an online mode, and a non-transitory computer-readable memory coupled to the one or more processors. The memory stores map data for rendering a digital map of a geographic area and a mapping module configured to (i) receive the map data from the network server, (ii) store the map data in the memory, (iii) subsequently to storing the map data, determine whether the user is likely to request the digital map within a certain period of time, (iv) determine a time when the map data should be removed from the memory based at least in part on the determination whether the user is likely to request the digital map again within the certain period of time, and (v) remove the map data from the memory at the determined time.

DETAILED DESCRIPTION OF THE DRAWINGS

Overview

Figure 1:
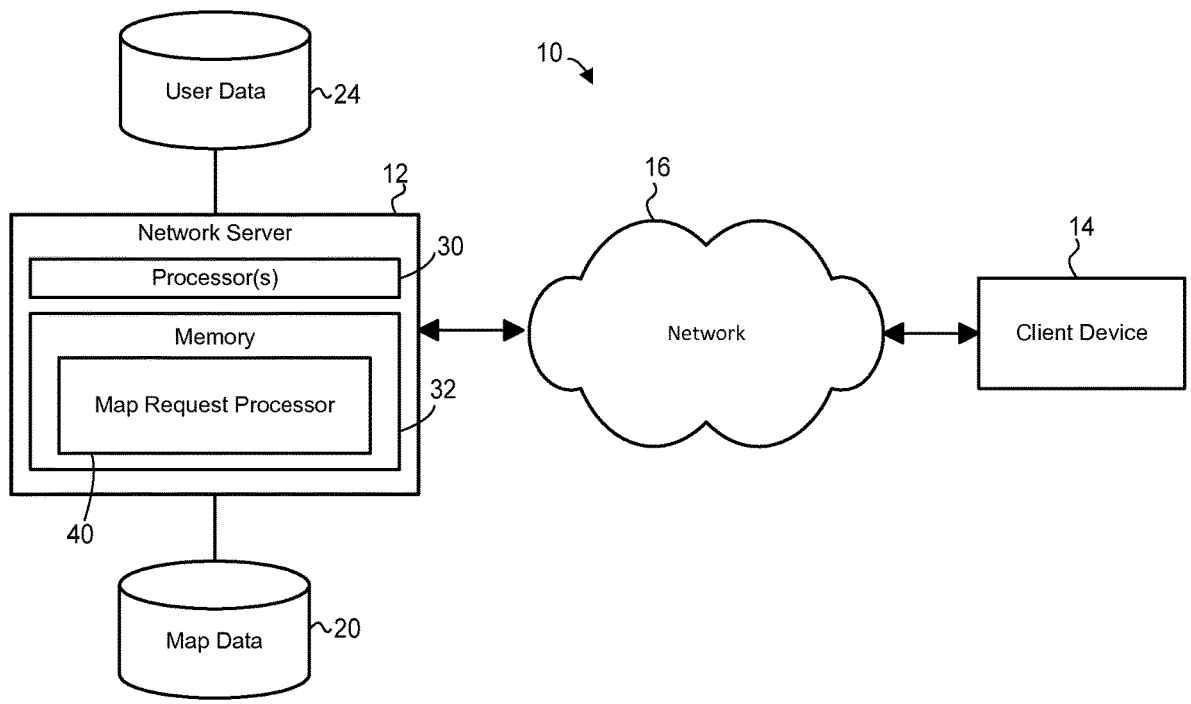
FIG. 1 is a block diagram of an example system in which a client device dynamically expires offline map data to preserve memory, in according with the techniques of this disclosure.

A digital mapping module operating in a portable client device fetches map data into an offline cache and, to preserve memory resources, removes map data from the offline cache in view of the anticipated subsequent use of the map data. As used herein, the term "offline cache" or simply "cache" refers to any suitable region in the memory of the portable client device that stores data for subsequent and/or recurring use. For example, offline cache can be implemented in the persistent memory such a flash drive or a hard disk.

More particularly, the mapping module can determine whether the user is likely to visit a certain region once, regularly, or at some other frequency and/or interval. If the visit, or several visits, are likely to occur only within a short period of time, the mapping module can specify a relatively short expiration period for the map data. The expiration period may approximately coincide, or exceed by a substantially short time, the period during which the user is expected to make the one or more visits. If, on the other hand, the user is likely to visit the region multiple times during a relatively long period of time, the mapping module can specify a relatively long expiration period. More generally, the mapping module can specify an expiration period in view of any combination of the number of expected visits and the duration of a time interval, as further discussed below. To determine whether the user is likely to use the map data again, the mapping module can, for example, compare the distance of the geographic area corresponding to the map data to the user's home location, for example. As another example, the mapping application can determine whether the user used the map data within a certain period of time.

In an example scenario, Alice from Seattle, Wash. plans a hiking trip to the Grand Canyon national park using an online service with which the mapping application is associated. The mapping application determines that the portable device Alice uses is unlikely to have reliable network connection while on this trip, and prefetches potentially relevant map data, such as satellite imagery of the hiking trails, into the cache of her portable device. The mapping application then determines that Alice is unlikely to need the satellite imagery of the hiking trails within the substantially near future, such as several weeks or months, of the end of her trip. Accordingly, the mapping application can set the expiration time to exceed the estimated duration of Alice's hiking trip by several days. In another scenario, the mapping application can determine that Alice's several trips to small town in Oregon in the past month during business days, where network coverage is generally unreliable, may be indicative of a certain regularity. Thus, the mapping application can determine that Alice is likely to visit the same place again in the next month, and may set the expiration time to extend slightly beyond the one-month mark.

The mapping module can also consider the availability of memory resources. When the amount of available memory in the cache is low, the mapping module can adopt a generally more aggressive policy toward expiring map data. In other words, the mapping module can set earlier expiration time(s) for map data when the available memory in the cache is low. Examples of other signals the mapping module can use include the projected quality and/or availability of the network connection, so that a client device that is likely to have reliable network connection in a certain geographic area may not require as much cached offline data.

In one implementation, the mapping module can expire map data by setting timers that operate in substantially real-time. For example, upon determining that a certain set of map data, such as a group of map tiles $T_1, T_2, \ldots T_N$ (map tiling is further discussed below) should expire at time t, the mapping module can configure a timer TMR to expire approximately at the time t, associate an event handler with timer TMR, where the event handler removes the map tiles $T_1, T_2, \ldots T_N$ from the offline cache upon activation, and activate timer TMR. In another implementation, the mapping module "marks" the map tiles $T_1, T_2, \ldots T_N$ for expiration at time t by setting appropriate parameters in the offline cache or another suitable region of the memory. The mapping mode then periodically, such as once every twenty minutes, once every three hours, once a day, or at any other frequency, can visit map tiles stored in the offline cache and delete those tiles that have expired. Thus, according to this approach, a map tile that expires at 12:00 pm on a certain day can be deleted a few minutes, hours, or even days later. More generally, the mapping application can cause map data to be removed from offline cache at some time corresponding to the expiration time.

The mapping module can fetch the map data into the offline cache in accordance with explicit requests from the user (e.g., by positioning the viewport over a new area) or implicit requests from the user (e.g., when the user requests navigation instructions) requests from the user, or both. Additionally or alternatively, the mapping module in some cases may automatically prefetch the map data into the offline cache based on various signals, prior to receiving a request for the corresponding digital map from the user. In general, the techniques for dynamically expiring offline map data can be applied to any suitable type of map data, regardless of which technique was used to select and store map data for storage in the cache.

Example System

FIG. 1 illustrates an example system 10 in which a client device 14 dynamically determines expiration time for offline map data and removes the map data from cache in accordance with the determined expiration time. The client device 14 is communicatively coupled to a network server 12 via a communication network 16, which can be any suitable network including wired and/or wireless links. For simplicity, FIG. 1 illustrates only one instance of a network server 12. However, the network server 12 in other implementations can include multiple servers capable of communicating with each other, arranged according to any suitable topology. Similarly, the system 10 in general can include any number of client devices 14. Moreover, in some scenarios, the same user can operate multiple client devices 14, of the same or different types. For example, a certain user can access the online with which the system 10 is associated via her smartphone as well as via her tablet computer.

The server 12 can include one or more processor(s) 30 coupled to a memory 32, which can include persistent and/or non-persistent components. A map request processor 40 can be implemented as sets of instructions stored in the memory 32 and executed on the one or more processor(s) 30. In operation, the map request processor 40 can provide map data for rendering a digital map of geographic areas to the client device 14.

The server 12 is coupled to a map database 20, which can be implemented in one or several servers (or, if desired, as a component of the network server 12). The map database 20 can store descriptions of geometry and location indications for various natural geographic features (e.g., rivers, mountains, forests) as well as artificial geographic features (e.g., roads, buildings, parks). The map data can include, among other data, vector graphics data, raster image data, and text data. In an example implementation, the map database 20 organizes map data into map tiles, which generally correspond to a two-dimensional organization of geospatial data into a quadtree, which is a data structure in which each node non-leaf node has no more than four children. Each map tile in this case corresponds to a square geographic region, with the size of the square being dependent on the level of magnification, or zoom level. Thus, each map tile at a given zoom level is divided into four tiles at the next level, up to the highest zoom level. The map request processor 40 can receive, from the client device 14, a request for a certain location or area and an indication of the desired zoom level, identify a set of map tiles necessary for rendering a digital map of the corresponding area at the specified zoom level, and transmits the map tiles to the client device 14.

With continued reference to FIG. 1, the server 12 also can access a user database 24 storing user data specific to users of various client devices, such as the client device 14. For a certain user, the user data can indicate her home location, her work location, her frequently searched-for locations, various preferences, etc. In some implementations, the user data also includes indications of upcoming trips to destinations the user does not visit regularly or often, the timing of these trips, etc. Further, in some implementations, some or all of the user's data is stored in the memory of the client device 14 rather than in the user database 24.

As used herein, the term "trip" refers to travel that extends beyond the user's routine, such as commute to and from work or driving across town to a pottery class. The system 10 can detect such planned or ongoing trips as, for example, vacation travel, weekend travel, work-related travel to a new destination, or other irregular travel.

In operation, the server 12 and/or the client device 14 can utilize the data stored in the user database 24, in the memory of the client device 14, in any other location, or any combination thereof, to estimate the likelihood that the user will request digital maps of certain geographic areas. As part of the process of estimating this likelihood, the server 12 and/or the client device 14 can determine how frequently the user visits, and/or expected to visit, a certain area. In some embodiments, the user operates certain controls and/or installs certain applications to allow the server 12 and/or the client device 14 to utilize the user's data in this manner.

Figure 2:
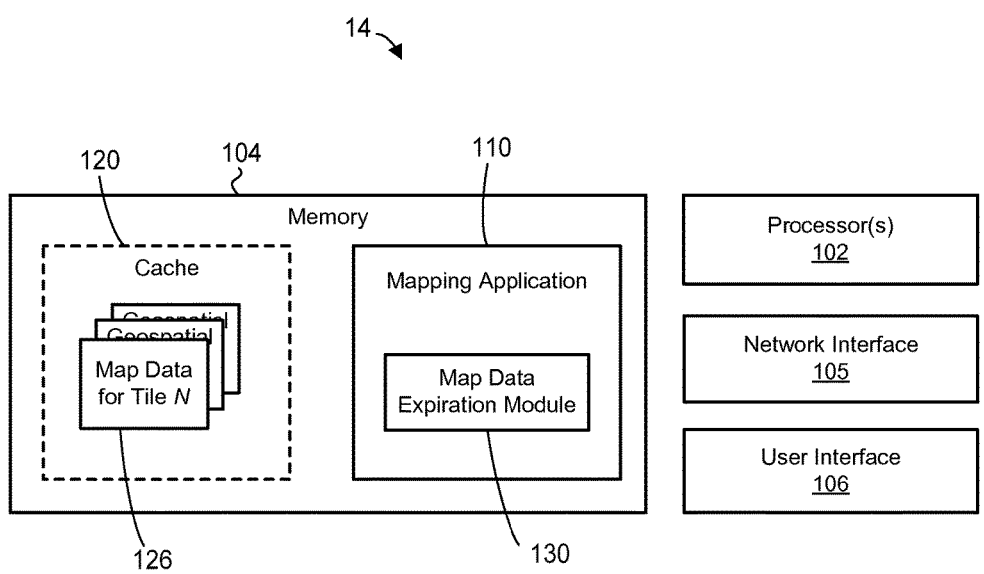
FIG. 2 is a block diagram of an example client device that can operate in the system of FIG. 1.

FIG. 2 is a block diagram illustrating an example implementation of the client device 14. The client 14 can be any computing device that relies on a network connection to retrieve map data for generating an interactive digital map. The client device 14 can be, for example, a laptop computer, a smart phone, or a tablet computer. The client device 14 includes one or more processor(s) 102, a computer-readable memory 104, a network interface 105, and a user interface 106. In some implementations, the one or more processor(s) 102 include a central processing unit (CPU) as well as a graphics processing unit (GPU) for efficiently rendering graphics content. The user interface 106 can include such components as, for example, a screen, a touchscreen, a keyboard, a microphone, one or more speakers, etc. The memory 104 can be a non-transitory memory including persistent (e.g., flash drive) and/or non-persistent (e.g., RAM) components.

The memory module 104 stores instructions that implement a mapping application 110, which can be a special-purpose mapping application or a general-purpose application such as a web browser that includes a mapping application programming interface (API), for example. The memory module 104 also implements a cache 120 for storing offline map data 126, which can be organized into tiles. The mapping application 110 includes a map data expiration module 130 (e.g., as one or several software routines) that determines expiration times for the map tiles that make up the offline map data 126 and removes portions or the entirety of the map data 126 upon expiration.

Figure 3:
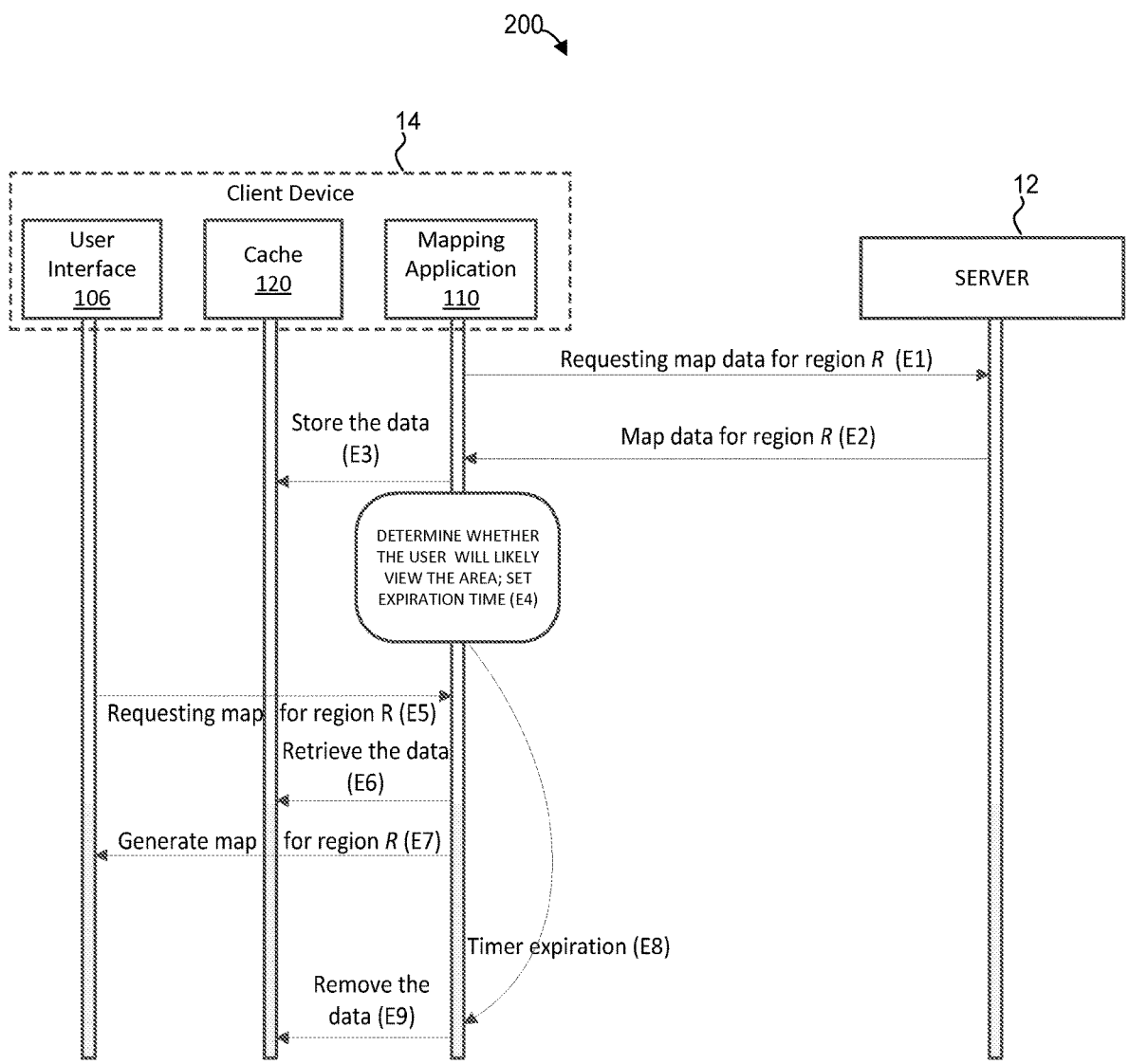
FIG. 3 is message flow diagram of an example scenario in which the client device of FIG. 1 retrieves offline map data from a network server and expires the offline map data in view of one or several signals.

For additional clarity, FIG. 3 illustrates an example scenario 200, in which several components of the client device 14 interact with each other and with the server 12 to retrieve and dynamically expire offline map data. In FIG. 3, each vertical line schematically represents the timeline of the corresponding component, with events depicted lower on the page occurring after the events depicted higher on the page. The flow of information between the components is represented by arrows. An arrow in different situations can represent a message propagated between different physical devices, a message propagated between tasks running on the same device, a function call from one software layer to another software layer, a callback function invoked in response to a triggering event, etc. Further, a single arrow in some cases can represent a sequence of function calls and/or messages.

According to the scenario 200, the mapping module 110 operating in the client device 14 requests map data for rendering a certain geographic region R (event E1). The mapping module 110 can generate this request in response to a command received via the user interface 106 or, in some cases, automatically prior to receiving the actual request from the user. For example, the user can request a digital map of Seattle, Wash. for immediate viewing. In another case, the user can operate a control to request that map data for Seattle, Wash. be prefetched for a later use, when the user expects the client device 14 to operate in the offline mode. In yet another case, the mapping application 110 can automatically determine that map data for Seattle, Wash. should be prefetched in view of the estimated probability that the user will wish to view such a map later, and the probability that no network connection will be available at that time.

The network server 12 then provides map data for rendering a certain geographic region R (event E2), while the client device 14 operates in the online mode. More particularly, in the online mode, the client device 14 can establish a sufficiently reliable network connection with the server 12. In general, the client device 14 can transition from the online mode to the offline mode for a variety of reasons, such as insufficient quality of service or roaming charges, for example.

As indicated above, the map data can be provided in the form of map tiles, which can include vector-based descriptions of geographic features, such as roads, buildings, bodies of water, and forested areas. The map tiles also can include text labels and raster (bitmap) imagery. The network server 12 can provide, with every map tile, an indication of a location to which the map tile corresponds, so that the map application 110 can assemble a digital map from multiple map tiles. Moreover, the network server 12 can provide a version identifier for each tile. The mapping application 110 stores the received map tiles in the cache 120 (event E3).

The mapping module 110 then determines whether the user will likely view the digital map at a future time (event E4), typically within a certain finite period. For example, the map data expiration module 130 can determine whether the user is going on a trip in view of signals as a search for airfare, a comparison of the distance between the centroid of region R to the user's home location and work location, previous requests for map data related to region R submitted by the user, etc. The map data expiration module 130 also can determine how often the user visited region R in a certain period of time. Depending on the implementation, the map data expiration module 130 can also consider the regularity of these visits. Thus, for example, the map data expiration module 130 in one implementation and/or scenario can determine that the user visited region R three times in one month and assign a certain weight W to this determination, regardless of how far in time these visits were spaced apart. In other implementation, the map data expiration module 130 can assign weight $W_1$ to this determination if the visits were spaced apart regularly, and a different weight $W_2$ if all of the visits occurred at the end of the month, and no visits occurred earlier in the month. More generally, the map data expiration module 130 can determine the frequency of visits in any suitable manner. The user, in some embodiments, activates certain controls and/or installs the mapping module 110 in a certain manner to allow the map data expiration module 130 to analyze these signals in the user's profile.

In response to determining that the user is likely temporarily visiting or planning to visit region R, the map data expiration module 130 can assign a relatively short expiration time to the map data. For example, if the map data expiration module 130 determines that the user is likely going on a trip the next day for three days, the map data expiration module 130 can assign the expiration period of 4 days or one week to the map data for region R. If, on the other hand, the map data expiration module 130 determines that region R includes the user's home location or a place to which the user frequently drives, as reflected by requests for driving directions, the map data expiration module 130 sets a much longer expiration period (or no expiration period) for the corresponding map data.

In some cases, the mapping module 110 can fetch map data related not only to the actual or projected destination of the user, but also to geographic regions through which the user may be passing. For example, the mapping module 110 can determine that the user is going to a concert and prefetch map data corresponding to the location of the concert as well the areas through which the user would drive, if the point of origin if the user's home. The mapping module 110 the can configure the prefetched map data to expire the day after the concert. In another example scenario, the user may search for available tables at a restaurant in a nearby city for Friday night. The mapping module 110 can prefetch the map data for the location of the restaurant as well as map data for the areas through which the user may drive, and set the expiration date for Monday, so that the map tiles continue to be available in the offline cache through the weekend.

When event E1 occurs as part of a prefetching procedure, where the mapping module 110 automatically requests the map data in anticipation of the user's future requests, the map data expiration module 130 can determine whether the user's requests actually occurred within a certain period of time. In other words, the map data expiration module 130 can determine whether the mapping module 110 had made an accurate prediction. If the user did not request the map data within the expected period of time, the map data expiration module 130 can expire the map data immediately or within a relatively short period of time.

The map data expiration module 130 can also utilize other signals to determine when map data should expire, such as the amount of free memory in the cache 120, the present and projected network connectivity, etc. More generally, the map data expiration module 130 can utilize any suitable set of signals to determine expiration time for offline map data.

As illustrated in FIG. 3, the map data expiration module 130 can start one or multiple timers corresponding to the expiration time of some or all of the offline map data. In another implementation, the map data expiration module 130 merely marks offline map data for removal at a certain time, periodically "wakes up," and removes map data that recently expired.

Further, the map data expiration module 130 can dynamically respond to various events related to the map data and, in some situations, deactivate timers, reset timers, adjust timers, or adjust the expiration time assigned to portions of the map data. More particularly, the map data expiration module 130 can initially determine that a certain unit of map data should expire at time $t_{Exp}$, based on the expectation that the mapping application 110 will not access this unit of map data between times $t_1$ and $t_{Exp}$, where $t_1 < t_{Exp}$. However, the mapping application 110 then can access the unit of map data at time $t_2$, where $t_1 < t_2 < t_{Exp}$. In response, the map data expiration module 130 can determine a new expiration time for the unit of map data, taking the recent use at time $t_2$ into account as a new signal.

Depending on the implementation, the map data expiration module 130 can execute the action(s) corresponding to event E4 once or multiple times for certain map data. For example, in one embodiment, the map data expiration module 130 determines expiration time upon arrival of the map data to the client device 14. In another embodiment, the map data expiration module 130 periodically (e.g., once an hour) reviews offline map data and determines expiration time on a per-tile basis or according to another suitable scheme.

In some implementations, at least some of the actions corresponding to event E4 are executed on the network server 12 additionally or alternatively to execution on the client device 14. For example, in one such implementation, the network server 12 determines the expiration time for map data and provides the expiration time along with each map tile. The map data accordingly can have the following general format: Tile $T_1$: map data={feature 1, feature 2, . . . feature N}, version number=$V_1$, expiration time=$t_1$; Tile $T_2$: map data={feature 1, feature 2, . . . feature L}, version number=$V_1$, expiration time=$t_2$; etc. Further, if desired, expiration time can be defined in terms of events rather than absolute time. For example, expiration time for a certain map tile can be defined as "an hour after viewing," so that the map data expiration module 130 removes certain offline map data approximately one hour after the user views (or otherwise utilizes) this map data. Because the network server 12 may have access to a more robust set of signals than the client device 14, the network server 12 in general can generate a more accurate prediction when offline map data can be expired without causing a "cache miss," or the situation where the mapping module 110 fails to find necessary map data from the cache 120.

With continued reference to FIG. 3, the user interface 106 can forward a user request for a digital map to the mapping module 110 (event E5), and the mapping application 110 retrieves the map data from the cache 120 (event E6). The mapping application 110 then generates a digital map of the geographic region R and provides the digital map to the user via the user interface 106. When the timer expires for certain offline map data (event E8), the map data expiration module 130 removes the corresponding map data from the cache 120 (event E9).

In other embodiments, the map data expiration module 130 or another component operating in the mapping module 110 can mark map tiles of other units of map data in the cache 120 for deletion upon initial storage in the cache 120, in response to a certain event, or at a regular time interval. The map data expiration module 130 then removes the units of map data in the cache 120 at some time after these units have expired. For example, the map data expiration module 130 can perform a daily "sweep" of the cached map data to determine what portions of the map data can be deleted. In yet another embodiment, the map data expiration module 130 can remove map data more opportunistically in response to other triggering events, such as addition of storage of new map data in the cache 120. Thus, in various embodiments, the map data expiration module 130 removes expired map data from the cache 120 substantially in real time upon expiration, at regularly scheduled intervals, or at other times after the map data has expired.

Figure 4:
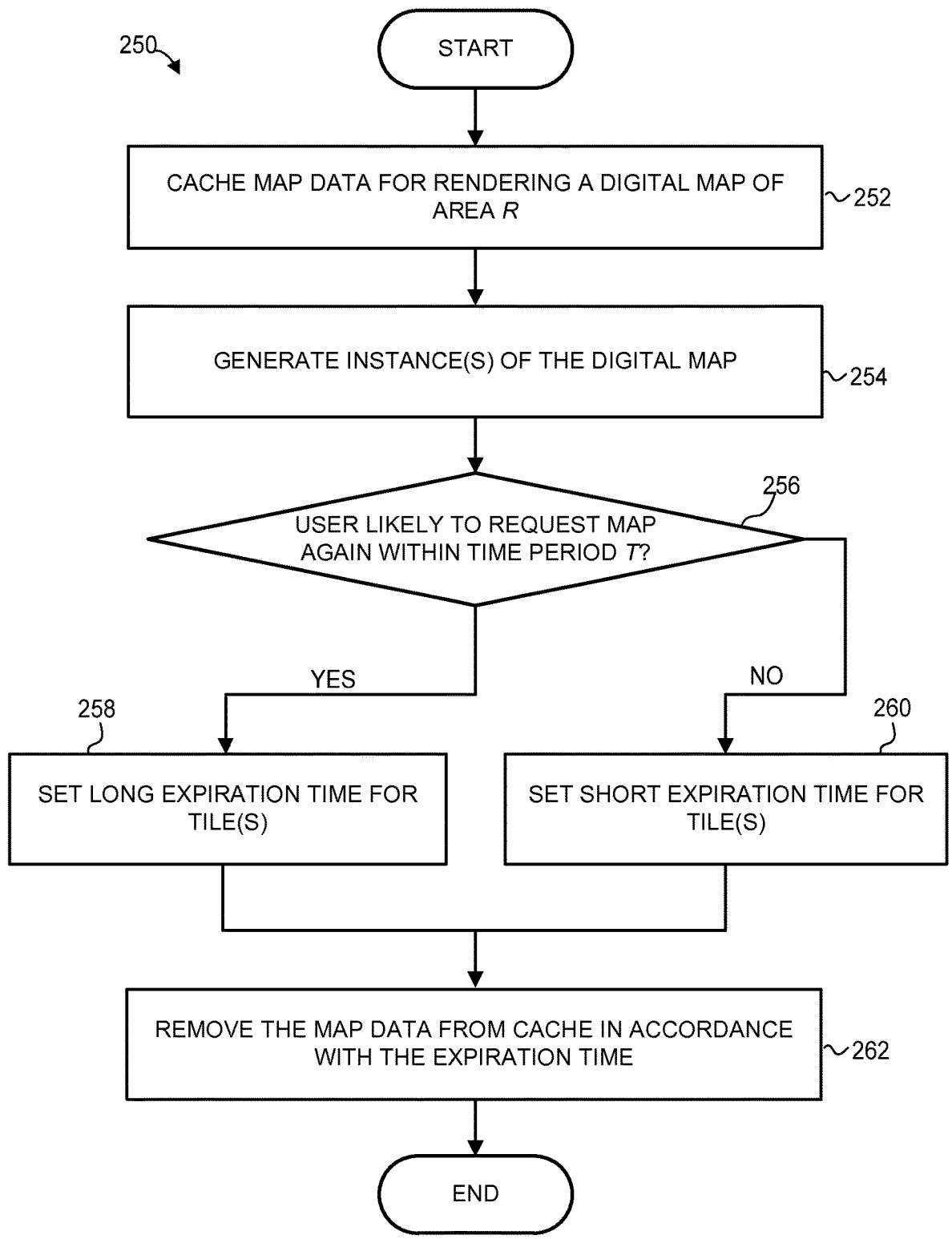
FIG. 4 is a flow diagram of an example method for managing offline map data, which can be implemented in the client device of FIG. 1.

Next, an example method 250 for managing offline map data is discussed with reference to FIG. 4. The method 250 can be implemented as software instructions executed on one or more processors. For example, the method 250 can be implemented in the client device 14.

The method 250 begins at block 252, where map data for generating a digital map of geographic area R is cached in the memory of a client device. One or multiple instances of the digital map of geographic area R are generated at block 254. Techniques of blocks 252 and 254 may be performed by the mapping application 110 depicted in FIG. 2, for example. In an example scenario, the mapping application 110 caches several hundred map tiles covering Yellowstone National Park at a certain zoom level, upon determining that the user is probably planning a three-day hiking trip through the park, and in view of the lack of cellular coverage in at least some part of the park.

At block 256, the method 250 determines whether the user is likely to request the digital map of this area again, within a certain time period. If it is determined that the user is likely to request the digital map again, a relatively long expiration time is set for the map data at block 258. On the other hand, if it is determined that the user is unlikely to request the digital map again within the period of time, a relatively short expiration time is set at block 260. Techniques of blocks 252 and 254 may be performed by the map data expiration module 130, for example. To continue with the example scenario above, the map data expiration module 130 may not be able to identify any prior hiking trips to this park by the user, and in view of this signal and possibly a set of other signal, set a relatively short expiration time.

The map data is then removed from the cache in accordance with the expiration time at block 262. Techniques of blocks 252 and 254 may be performed by the mapping application 110, for example. The method 250 completes after block 262.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for dynamically expiring offline map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing offline map data, the method comprising: fetching, by one or more processors, into a memory of a computing device, map data for generating a digital map of a geographic area; retrieving, by the one or more processors, the map data from the memory to generate the digital map in response to a first request from a user of the computing device, wherein the digital map is generated at the computing device; determining, by the one or more processors, at least one of (i) a frequency of visitation of the geographic area by the user or (ii) whether the user is expected to make one or more visits to the geographic area; determining, by the one or more processors, a likelihood of a second request to generate at least a portion the digital map again at the computing device within a certain period of time based on the determination of at least one of (i) the frequency of visitation or (ii) whether the user is expected to make one or more visits; determining, by the one or more processors, a time when the map data should be removed from the memory based at least in part on the determination of the likelihood of the second request; and removing, by the one or more processors, the map data from the memory at a time corresponding to the determined time;

determining, by the one or more processors, a time at which the request for the digital map is received, including determining at least one of (i) day of week, and (ii) time of day; wherein determining the time when the map data should be removed from the memory is further based on the determined time at which the request for the digital map is received.

2. A portable computing device comprising: one or more processors; a network interface configured to communicatively couple the portable computing device to a network server via a communication network, in an online mode; a non-transitory computer-readable memory coupled to the one or more processors and storing thereon: map data for rendering a digital map of a geographic area; and a set of instructions executable on the one or more processors, wherein the set of instructions implements a mapping module configured to: (i) receive the map data from the network server, (ii) store the map data in the memory, (iii) determine at least one of (i) a frequency of visitation of the geographic area by a user or (ii) whether the user is expected to make one or more visits to the geographic area, (iv) subsequently to storing the map data, determine a likelihood of a request from the user to generate the digital map within a certain period of time based on the determination of at least one of (i) the frequency of visitation or (ii) whether the user is expected to make one or more visits, (v) determine a time when the map data should be removed from the memory based at least in part on the determination whether the user is likely to request the digital map again within the certain period of time, and (vi) remove the map data from the memory at the determined time, wherein the mapping module is configured to: determine, a time at which the request for the digital map is received, wherein the time includes at least one of (i) day of week, and (ii) time of day; determine the time when the map data should be removed further in view of the determined time.

\* \* \* \* \*